C. C. KOELN.
BORING TOOL.
APPLICATION FILED JAN. 17, 1912.

1,438,653.                                      Patented Dec. 12, 1922.

Inventor:
CHRISTIAN C. KOELN,
By John W. Bruninga
His Attorney

Patented Dec. 12, 1922.

1,438,653

UNITED STATES PATENT OFFICE.

CHRISTIAN C. KOELN, OF ST. LOUIS, MISSOURI.

BORING TOOL.

Application filed January 17, 1921. Serial No. 437,813.

*To all whom it may concern:*

Be it known that I, CHRISTIAN C. KOELN, a citizen of the United States, and residing at St. Louis, Missouri, have invented the new and useful Improvement in Boring Tools, of which the following is a specification.

This invention relates to tools and more particularly to boring tools. In some classes of tools, such as boring tools, a cutter is used which has cutting edges at its ends adapted for cooperation with the work to form therein a hole of a given diameter as determined by the distance between the cutting edges. Accordingly the cutting edges are accurately ground in order to form the hole with the required accuracy, and in most classes of work, even slight variations cannot be tolerated. Of course, the cutting edges of even high speed steel will become dull, but where sharpening is attempted, in such cases the grinding operation will reduce the distance between the cutting edges so that a hole of the desired diameter cannot be bored.

In order to permit grinding of the cutting edges while still maintaining the proper distance therebetween, mechanical adjustment is resorted to; this, however, presents mechanical difficulties and requires a divided cutter subject to errors and not as satisfactory as a one-piece cutter in which the cutting edges are connected by a body of metal.

One of the objects of this invention, therefore, is to provide a cutter in which the cutting edges are on the same piece of metal and, therefore, connected but whereby the cutting edges may be expanded.

Further objects will appear from the detail description taken in connection with the accompanying drawing, in which.

Figure 1:
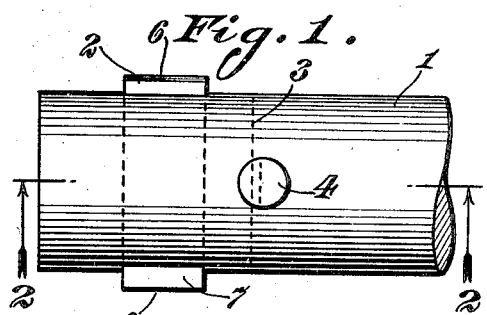
Figure 1 is a side elevation of a boring tool showing the application of an embodiment of this invention.
Figure 2:
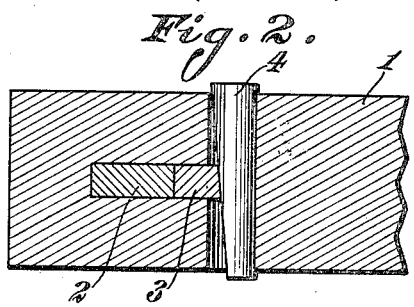
Figure 2 is a section on the line 2—2, Figure 1.

Referring to the accompanying drawings, and more particularly to Figures 1 and 2, 1 designates a boring bar of any suitable construction which is slotted to receive a cutter 2 which is held in place by a gib 3 and an ordinary taper pin 4. The general construction of such a cutter is well known in the art and further detail description thereof is, therefore, unnecessary.

Figure 3:
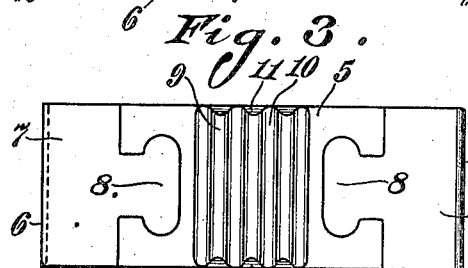
Figure 3 is a face view showing a cutter embodying this invention.
Figure 4:
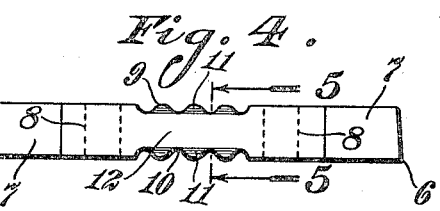
Figure 4 is a side elevation of Figure 3.
Figure 5:
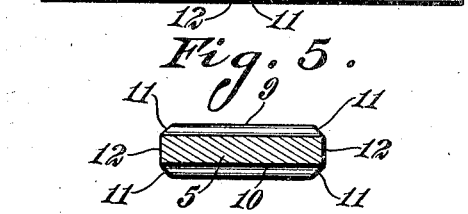
Figure 5 is a section on the line 5—5, Figure 4.

Referring now to Figures 3, 4 and 5, the cutter comprises a body 5 of a malleable material, that is, one capable of being extended or shaped by beating with a hammer or by transverse pressure; a good material for such purpose is the ordinary cold rolled steel. This body joins a pair of cutting edges 6 which may be formed on any suitable parts 7 constructed of any suitable material, such as high speed steel. These parts 7 may be permanently secured to the body 5 in any suitable manner as by providing the parts with tongues 8 taking into corresponding grooves in the body and the body may then be pressed over the tongues so as to form in effect an integral structure with the parts 7.

The malleable body 5 is undulatory or tortuous in form and is, therefore, provided with undulations extending therealong and comprising hills 9 and valleys 10. These undulations may be formed in the surface in any suitable manner as by forging.

Assuming now that the cutter has its cutting edges definitely spaced so as to bore a hole of a given diameter and assuming that the cutting edges have become dull and it is desired to grind the same but still maintain the proper spacing of these cutting edges; the procedure is then as follows: The cutter being removed from the boring bar is subjected to transverse pressure applied at its body part and on the undulations so as to cause pressure flow of the material of the body and by rectification or straightening of the same, to cause expansion of the edges so as to space these edges further apart. This may be accomplished by placing the cutter on an anvil and hammering down on the hills 9 so as to flatten them out or by hammering in the valleys 10 so as to spread them still further; either of these operations will cause a pressure flow of the body metal and extension of the body lengthwise so as to cause the desired expansion of the cutting edges. Ordinarily this expansion need only be a few thousandths of an inch and even a small amount of pressure will cause the desired extension. After the desired extension has been obtained so that the edges will be expanded beyond their normal spacing, these edges can be reground so as to sharpen the cutter and this grinding can be continued until the cutter is ground down to the proper spacing of the cutting edges.

In order to permit extended hammering on the undulating body, the side edges thereof are beveled as shown at 11 which will compensate for transverse flow of the metal and prevent the extension of burrs laterally; accordingly even repeated hammering or working on the body will still present smooth and uninterrupted side faces 12 so that the cutter can fit properly in the slot in the boring bar 1 and against the gib 3. When the cutter is in place in the boring bar, the body 5 will be wholly within the bar as shown in Figure 1 so that the parts 7 will be directly supported by the bar whereby no excessive strain will be placed on the joints formed between these parts; this can, of course, be readily accomplished because the normal projection of the cutting edges beyond the boring bar is only a small fractional portion of an inch.

Figure 6:
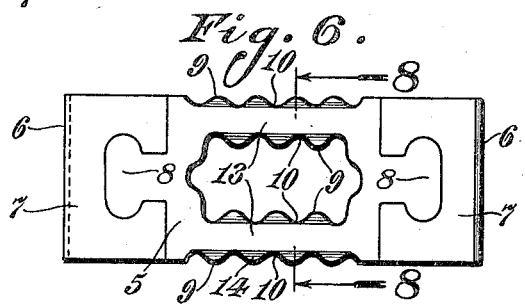
Figure 6 is a face view showing another cutter embodying this invention.
Figure 7:
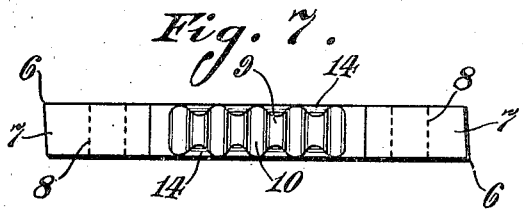
Figure 7 is a side elevation of Figure 6.
Figure 8:
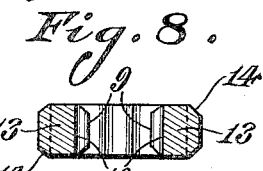
Figure 8 is a section on the line 8—8, Figure 6.

Referring to Figures 6, 7, and 8, the body is divided into two parts so as to provide legs 13 connecting the ends of the body to which are fastened the cutter parts 7, the tongues 8 being in this case on the body while the grooves are in the cutter parts, and accordingly these cutter parts may be connected to the body by pressure joints formed by compressing the cutter parts in an untempered condition on the body, these cutter parts being subsequently hardened. In this embodiment, each leg is made undulatory or tortuous by providing hills 9 and valleys 10 therein as in the preceding embodiment. The undulations may be differently formed. Thus, while in the embodiment shown in Figures 3, 4 and 5 the hills are directly opposite in the legs 13, Figures 6, 7 and 8, the hill on one side of the leg is opposite a valley on the other. It is, of course, obvious that in the embodiment shown in Figures 6, 7 and 8 the bar may also be extended by pressure applied to the malleable body. In this case, however, not only can the extension be greater, but the leading and lagging edge portions of the cutter edges can be separately adjusted as the legs are capable of independent extensions. Of course, in this embodiment the edges are again beveled as shown at 14 to prevent the formation of burrs.

Figure 9:
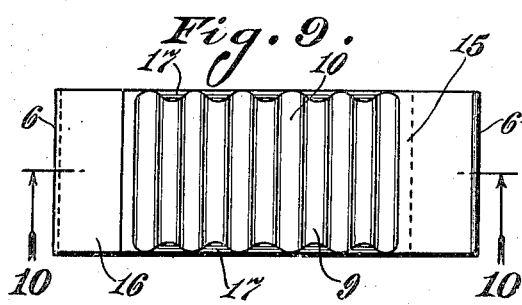
Figure 9 is a face view of a cutter showing another embodiment of this invention.
Figure 10:
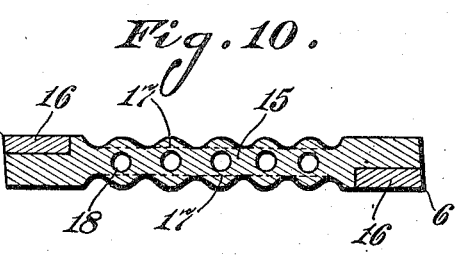
Figure 10 is a section on line 10—10, Figure 9.

In the embodiment shown in Figures 9 and 10, the malleable body 15 is undulated as in Figures 3, 4 and 5, but the cutting edges are formed by inserts 16 set into recesses in the malleable body and secured therein in any suitable manner as by welding. The edges are also beveled as shown at 17 to prevent the formation of burrs as heretofore described. In this embodiment the body is provided with perforations 18, which may be opposite the hills 10; this enhances the extension of the body, so that expansion of the cutting edges may be obtained with greater ease and to a greater extent. It will, of course, be understood that the cutter illustrated in the other embodiments may be provided with like perforations.

It will, therefore, be seen that the invention accomplishes its objects. A cutter is provided which is capable of extension so as to expand the cutting edges, at the same time always maintaining a permanent connection between these cutting edges. In practice the cutting edges may be repeatedly expanded in order to permit repeated grinding with the result that the life of the cutter is enormously increased.

It is obvious that various changes may be made in details within the scope of the appended claims without departing from the spirit of this invention; it is, therefore, to be understood that this invention is not to be limited to the specific details shown and described.

Having thus described the invention, what is claimed is:

1. In a tool, a cutter having cutting edges, and a tortuous malleable body joining said edges adapted by rectification thereof to cause expansion of said edges.

2. In a tool, a cutter having cutting edges and a malleable body joining said edges and provided with undulations in its surface, adapted by straightening of said undulations to cause expansion of said cutting edges.

3. In a tool, a cutter having cutting edges and a malleable body joining said edges, said body having a projection adapted by pressure flow of the material thereof into said body to cause expansion of said edges.

4. In a tool, a cutter having cutting edges and a malleable body joining said edges, the side edges of said body being beveled, whereby said body may be extended by flow of the metal to cause expansion of said edges, the bevel compensating for the transverse flow of the metal.

5. In a tool, a cutter having cutting edges and a malleable body joining said edges, said body being deformed for extension by longitudinal pressure flow of the body metal in order to cause expansion of said edges, and the side edges of said body being beveled adjacent the deformation thereof.

6. In a tool, a cutter having cutting edges and a malleable body joining said edges, said body having independent portions constructed and arranged for independent extensions in order to cause expansions of said edges at their leading and lagging tips respectively.

7. In a tool, a cutter having cutting edges, and a body joining said edges and split longitudinally into malleable elements which are adapted upon extension thereof to cause expansion of said edges.

8. In a tool, a cutter having cutting edges, and a body joining said edges and comprising tortuous malleable elements, adapted by rectification thereof to cause expansion of said edges.

9. In a tool, a cutter having cutting edges, and a body joining said edges and split longitudinally into malleable elements which are adapted for independent extensions to cause expansion of said edges at their lagging and leading tips respectively.

10. In a tool, a cutter having cutting edges, and a malleable body joining said edges, said body having transverse undulations, substantially as and for the purpose set forth.

11. In a tool, a cutter having cutting edges, and a malleable body joining said edges and split longitudinally into malleable elements, said elements having undulations codirectional with the cutting edges.

In testimony whereof I affix my signature this 30th day of November, 1920.

CHRISTIAN C. KOELN.